United States Patent [19]

Sabo et al.

[11] Patent Number: 4,600,120
[45] Date of Patent: Jul. 15, 1986

[54] MAGAZINE FOR DISPENSING CARTRIDGES INTO AN AUTOMATED ANALYZER

[75] Inventors: Michael K. Sabo, Glenview; Gary R. Johnson, Algonquin, both of Ill.

[73] Assignee: Abbott Laboratories, North Chicago, Ill.

[21] Appl. No.: 662,669

[22] Filed: Oct. 19, 1984

[51] Int. Cl.$^4$ .................. B65G 59/00; B65G 47/04; B65H 1/00
[52] U.S. Cl. ........................... 221/107; 221/108; 221/111; 221/112; 221/123; 221/268; 221/13; 221/258; 221/197; 198/565
[58] Field of Search ............ 221/108, 268, 271, 103, 221/107, 111, 112, 123, 191, 194, 258, 2, 6, 9, 13, 14, 197; 198/550, 616, 565, 540, 750, 550.01

[56] References Cited

U.S. PATENT DOCUMENTS

| | | | |
|---|---|---|---|
| 1,593,825 | 7/1926 | Higgins | 221/107 X |
| 3,023,974 | 3/1962 | Fürst | 221/197 X |
| 3,747,469 | 7/1973 | Ashley et al. | 198/550 X |
| 3,972,407 | 8/1976 | Kushigian | 198/540 X |
| 4,184,587 | 1/1980 | Hallstrom | 198/750 |
| 4,187,077 | 2/1980 | Covington et al. | 221/279 X |

FOREIGN PATENT DOCUMENTS

| | | | |
|---|---|---|---|
| 686981 | 3/1965 | Italy | 221/108 |
| 841912 | 1/1981 | U.S.S.R. | 221/268 |

Primary Examiner—Joseph J. Rolla
Assistant Examiner—Gregory L. Huson
Attorney, Agent, or Firm—Janet K. Hochstetler; Martin L. Katz

[57] ABSTRACT

A magazine is disclosed for dispensing generally cylindrical and elongated articles in a pre-determined order. The magazine comprises a series of shelves with a reciprocating ratcheting plate arranged perpendicular to the shelves. The ratching plate has surface configurations which allow the articles to be advanced in one direction of movement, and remain stationary relative to the shelves in a second opposite direction. The magazine is removable and may be pre-loaded to dispense in a pre-determined order. The magazine finds particular application in the dispensing of samples to an automated analyzer.

19 Claims, 8 Drawing Figures

MAGAZINE FOR DISPENSING CARTRIDGES INTO AN AUTOMATED ANALYZER

BACKGROUND OF THE INVENTION

This invention relates generally to magazines which can be pre-loaded with a quantity of objects and then used for repeatedly dispensing those objects. More particularly, the invention relates to a magazine for controllably dispensing a large quantity of objects which are elongate and generally cylindrical in shape as well as a method for pre-loading and dispensing such objects.

One common use of such a magazine is in connection with apparatus which perform automated instrumental analysis on various types of samples contained in cylindrical cartridges. For example, the apparatus disclosed in the co-pending U.S. patent application Ser. No. 663,095, filed Oct. 19, 1984, and commonly assigned herewith is capable of analyzing a series of individual biological samples in syringe-like cartridges. This analysis is performed in a cycle involving several steps performed on each sample cartridge such as the introduction of various reagents, incubation, optical assay, etc. The process is made fully automatic and capable of continuous operation because it loads each sample cartridge into a continually rotating wheel which transports it to the different operating stations. The rotation of the wheel and the position of the stations around the wheel are selected so as to provide the proper timing and duration of each step to be performed.

This particular mode of operation requires a source of sample cartridges which can deliver individual cartridges to the analyzing apparatus in a highly reliable manner. Naturally, it would be inconsistent with the object of providing for long periods of unattended performance to rely on manual input of each sample cartridge into the analyzing apparatus when required. Rather, a better system for supplying the sample cartridges would be one that could be pre-loaded with a large quantity of sample cartridges and then automatically dispense those cartridges when needed.

Although the sample cartridges used in the above apparatus are elongate and generally cylindrical, there are certain irregularities in their shape. Unfortunately, these irregularities present various problems in handling the cartridges which make otherwise simple loading methods or apparatus unworkable. For example, the gripping flange which protrudes from the barrel of the syringe keeps the cartridge from rolling in a straight line, thus complicating the use of gravity feed or stacking arrangements.

Further requirements are imposed on this type of magazine when it is used in connection with this automated analyzer. The magazine will have size constraints dictated by the analyzer. That is, the magazine must be made to fit in the analyzer. Also, to allow the analyzer to run for long periods without intervention, it will be desirable for the magazine to handle large numbers of cartridges. Additionally, in order to increase convenience in loading the magazine, it would be desireable to provide a magazine which can be readily detached and reattached to the analyzer and easily carried so that it can be loaded at a work station remote from the analyzer.

In addition to this specific analyzer, there exist other analytical and manufacturing applications which involve these same problems of handling elongate and generally cylindrical objects. It is likely that many of these applications would be benefited by an improved magazine which could be pre-loaded and then controllably and reliably dispense those objects on demand.

SUMMARY OF THE INVENTION

It is therefore the general object of the present invention to provide a magazine for loading cartridges which alleviates the above-mentioned problems. In particular, it is the object of the present invention to provide a magazine capable of being pre-loaded with a large quantity of cartridges which are generally cylindrical and then dispensing those cartridges on demand, in a pre-determined order, and in a highly reliable manner. It is also an object of the invention to provide a magazine which can be detached and reattached to the apparatus for which it dispenses its cartridge. It is a further object of the invention to provide a magazine which will fit within the size requirements dictated by the particular apparatus with which it is designed to operate.

The present invention is directed to improved apparatus and methods for achieving the foregoing objects, along with other numerous features and advantages, which are accomplished by providing a magazine comprising a plurality of shelves and a ratcheting plate. The ratcheting plate is arranged generally perpendicular to the shelves and has a major surface with surface features configured such that the objects to be dispensed can move in a first direction, which is perpendicular to the shelves, with less resistance than they can in a second opposite direction. The invention also includes a means for reciprocally moving the ratcheting plate in these first and second directions and through a distance which is greater than the greatest diameter of the objects. In addition, means are provided for moving the objects along the shelf toward the ratcheting plate.

An exemplary embodiment of the invention operates as follows. The objects to be dispensed are placed on the shelves and one object from each shelf is brought in contact with the ratcheting plate. As the plate is moved in the first direction, each object in contact with the plate is moved with it to a new position relative to the shelf on which it had been located. At this point, if an object had been adjacent to the last shelf prior to this movement in the first direction, then its new position is the dispensing position. Otherwise, the object is now at a position adjacent to another shelf. Concurrently, an object from the shelf furthest from the dispensing end moves in to fill the vacancy left by the object which has just been moved away in the first direction. When the plate is moved back in the second direction to its original position, the objects stay in their new position. This is so because the surface features on the ratcheting plate do not allow the objects to move relative to the plate when it is moved in the first direction, but do allow the plate to move relative to the objects when the plate is moved in the second return direction. Therefore, as the ratcheting plate is repeatedly moved in the first and second directions, the objects are sequentially taken from the shelves and moved down the ratcheting plate one level at a time until they have come to the dispensing position.

In the simplest embodiment, the means for moving the objects along the shelves comprises the placement of the shelves at an angle such that gravity will cause the objects to roll along the shelves. Also in this embodiment, gravity likewise benefits the operation of the ratcheting plate as it too is set at an angle and configured such that the dispensing position is at the bottom of the plate and the objects move more readily toward the dispensing position due to gravity.

BRIEF DESCRIPTION OF THE DRAWINGS

An exemplary embodiment of the invention summarized above is shown in the accompanying drawings wherein.

DETAILED DESCRIPTION OF THE INVENTION

Figure 1:
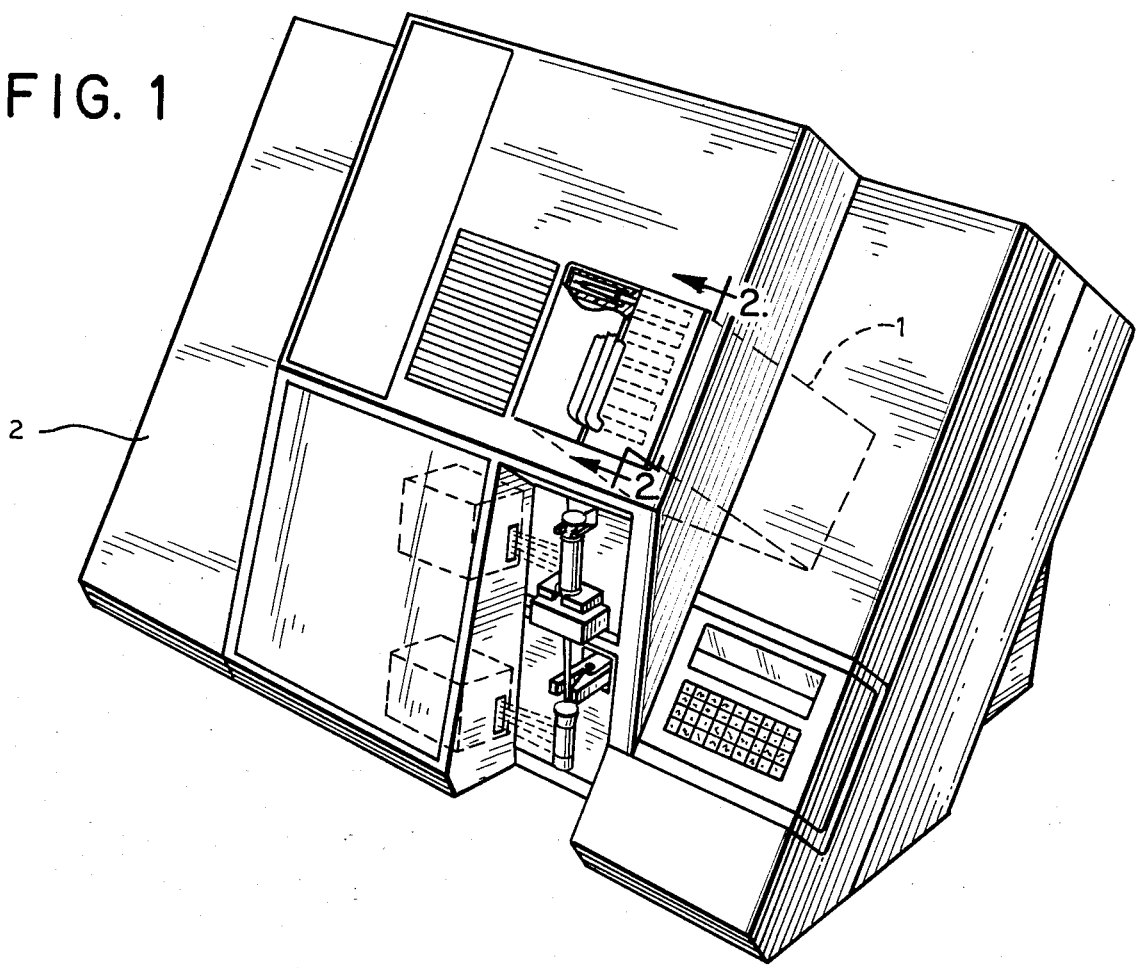
FIG. 1 is a perspective view of the magazine showing it positioned for operation with a blood analyzing apparatus.

Referring to the drawings, FIG. 1 shows the magazine of the present invention as it is connected to an analyzing apparatus, such as that for analyzing blood disclosed in the co-pending U.S. patent application with Ser. No. 663,095, filed Oct. 19, 1984, and commonly assigned herewith. The magazine, generally depicted by the numeral 1, can be releasably mounted in the analyzer 2. At predetermined time intervals the analyzer controls means by which each cartridge is loaded into a position where it can be further moved into a hole of the rotating wheel.

Figure 2:
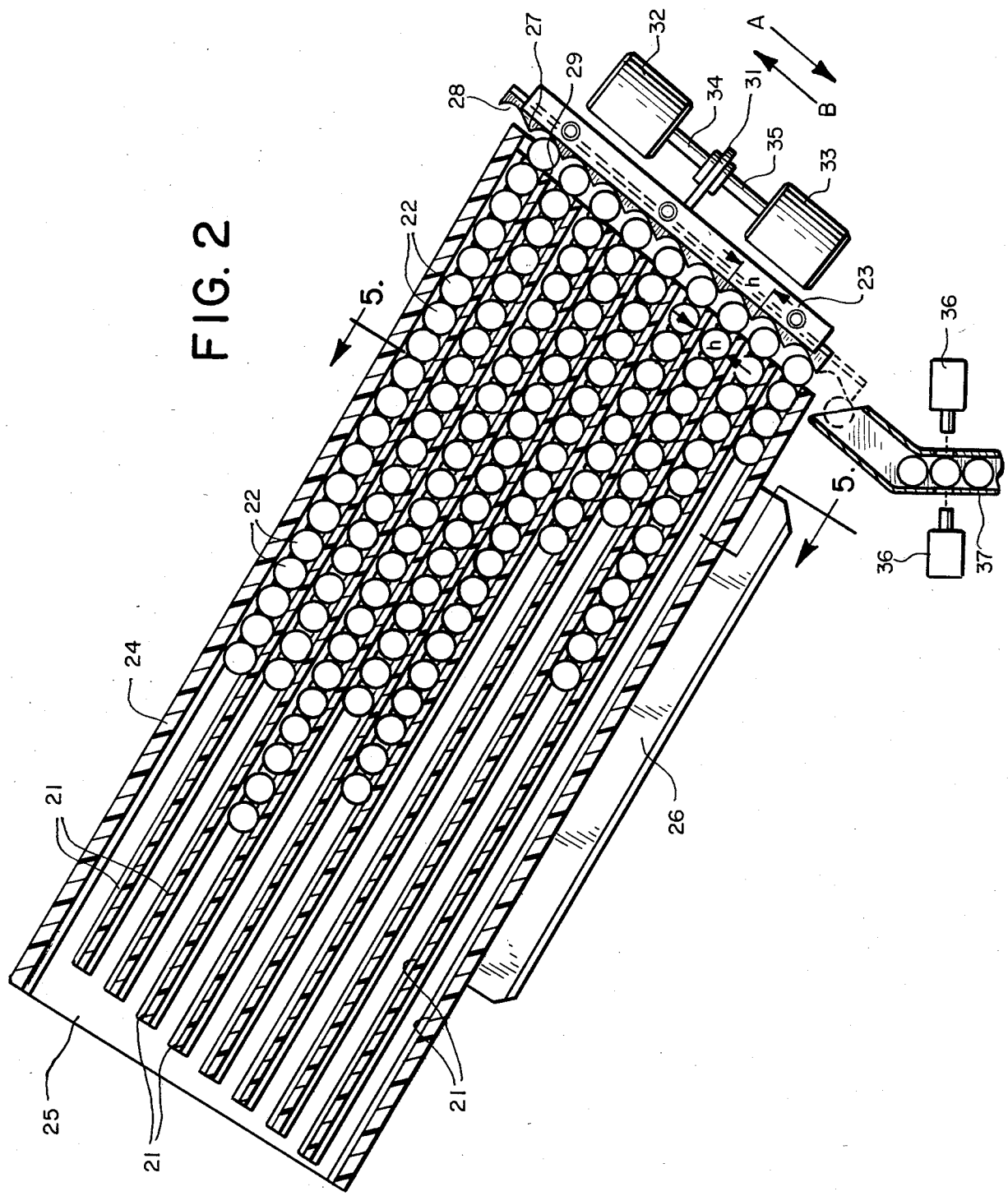
FIG. 2 is vertical cross section of the magazine of the present invention taken along line 2—2 of FIG. 1.

FIG. 2 is a cross-section taken through line 2—2 of FIG. 1. The magazine is comprised of a set of parallel shelves 21 which are spaced apart a distance h which is greater than the greatest diameter of the elongate and generally cylindrical cartridges 22 to be loaded on the shelves and dispensed from the magazine. Although it would be possible to construct a magazine with only one shelf, such a magazine may be useful in only certain applications, the multi-shelf embodiment being preferred for most applications because of its ability to handle larger numbers of cartridges. The shelves 21 are oriented at an angle with respect to the horizontal and, as a result, the force of gravity causes the cartridges 22 to roll along the shelves toward the dispensing ends 29 of the shelves 21. These dispensing ends 29 are substantially linear and contained within a single plane. The magazine also includes a top 24 and side walls (not shown). The end 25 of the magazine, which is distant from the dispensing ends 29, comprises a suitable opening to permit the loading of the cartridges into the shelves 21. Alternatively, a hinged or sliding door could be provided which could be opened for loading and closed during operation. The bottom shelf 21 has an attachment plate 26 which is configured to fit within a mating feature on the analyzer. Known releasable clamps (not shown) can be used for retaining the magazine in its usual dispensing position in the analyzer.

The ratcheting plate 23 has a major surface 27 which is substantially parallel to the plane containing the dispensing ends 29 of the shelves 21. The major surface 27 includes a series of elongate grooves 28. These grooves run parallel to the dispensing ends 29 of the shelves 21 and are spaced apart on the ratcheting plate 23 at the same distance h as the distance h between the shelves 21. The grooves 28 are configured so as to partially receive the cartridges 22. It is also noted that the cross-section of the grooves reveals that each is shaped so the cartridges may roll over the grooves easier in the direction indicated by arrow A than they can in the opposite direction indicated by arrow B. The way in which this effect is accomplished is illustrated best in FIG. 3a and will be discussed in greater detail in connection with that Figure.

The ratcheting plate 23 is connected to the magazine so as to allow it to move in directions A and B. This may be accomplished in various ways including providing lugs (not shown) protruding from the side ends of the ratcheting plate adapted to move within slots or channels (not shown) located in each of the side walls of the magazine. In the depicted embodiment, the means for moving the ratcheting plate 23 comprises a pair of opposing solenoids 32 and 33 which are alternately energized in a well-known manner for suitable periods such as 0.4 seconds. These solenoids are preferably attached to the analyzer, though they could also be attached to the magazine itself. The solenoids 32, 33 include push rods 34, 35, respectively, which are intended to alternatively act on the post 30 of the ratcheting plate. In particular, the push rod 35 of the lower solenoid 33 will push the post 30 and thus the dispensing plate 23 in direction B, and the push rod 34 of the upper solenoid will push the post 30 and thus the dispensing plate 23 in direction A. It would also be possible to operate the magazine with a single solenoid which pushes the post in direction B and allowing gravity to return the ratcheting plate in direction A. However, it has been observed by the inventors that to obtain the most positive and reliable action of the magazine, it is desirable to provide a quick and strong motion in both directions.

The actuation of solenoids can be accomplished by a mechanism which is either included in the analyzer or the magazine. Such a mechanism preferably comprises a well-known optical sensor 36 positioned across the top of a hopper 37 which holds a short stack of cartridges in position to be taken up by the analyzer. When a cartridge is taken up by the analyzer, the short stack drops, causing the optical sensor to detect the absence of a top cartridge and provide a signal to initiate alternate actuation of the solenoids.

Figure 3A:
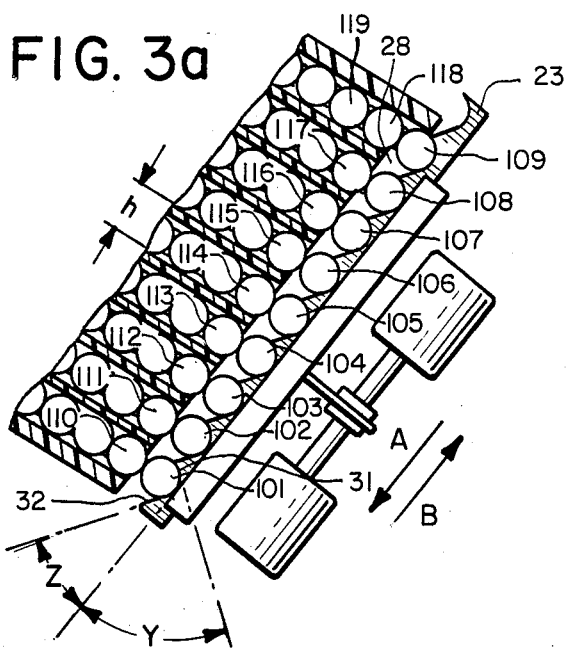
FIGS. 3a-3d is a series of simplified cross sections showing the sequence of the dispensing operation of the magazine of the present invention.

FIGS. 3a-3d are partial cross-sections showing the sequence of the dispensing operation of the magazine of the present invention. FIG. 3a, which depicts the magazine in an initial or "rest" position, shows the configuration of the surface features of the ratcheting plate 23. In the preferred embodiment, these surface features comprise elongate grooves 28 each having a width equal to the distance h between the shelves 21 and each shaped so as to allow partial entry by the cartridges. Each groove is comprised of an upper wall 31 and a lower wall 32. Each of these walls is configured so that the upper walls 31 is oriented generally at an internal angle Y with respect to the general plane of the ratcheting plate which is greater than the corresponding internal angle Z of the lower wall portions. As a result, the cartridges can roll with less resistance in direction A than they can in direction B. This cross section of the grooves 28 also shows that, in the preferred embodiment, the lower walls 32 are planar and the upper walls 31 are curved with a constant radius of curvature which is approximately equal to a radius of curvature defining a portion of the cartridge. This curved shape further facilitates the prevention of movement of the cartridge in direction B. In addition, this figure shows that cartridges 110–118 are pushing against the cartridges 101–109 thereby helping them to stay within the grooves of the ratcheting plate.

Figure 3C:
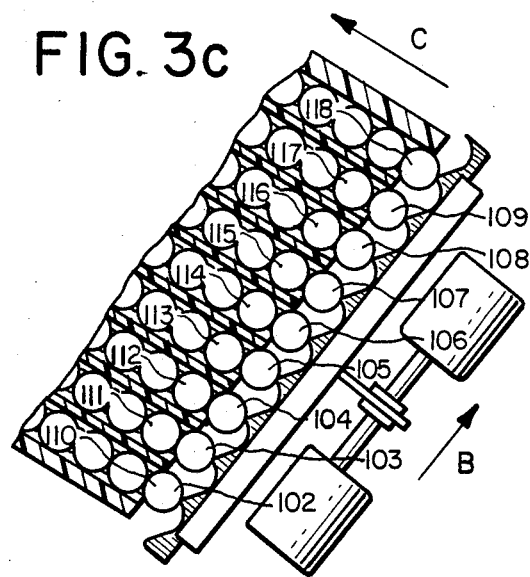
Figure 3B:
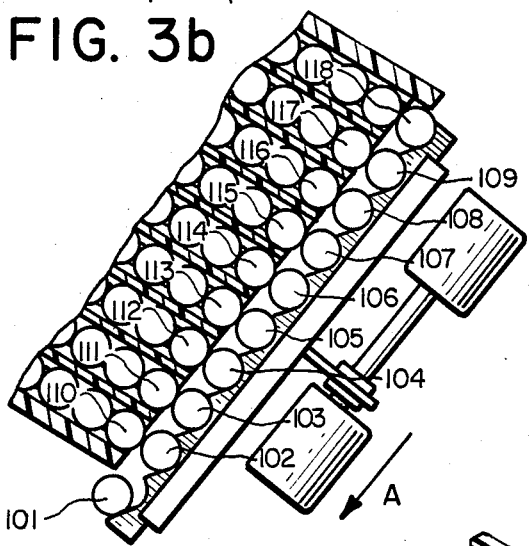

FIG. 3b shows the effects of moving the ratcheting plate a distance h and in direction A. Cartridges 102–109 are now aligned with the shelves below where they originated. Cartridge 101 is pushed below the bottom shelf and thereby dispensed from the magazine. Also, cartridge 118 has now rolled into contact with the ratcheting plate.

FIG. 3c shows the ratcheting plate returning in direction B. As shown, the cartridges 102–109 are not pushed up in direction B, but rather stay aligned with the same shelves. This is due in part to the lesser slope of the lower wall 32, and in part due to gravity. Also, it is shown that cartridges 110–117, and 119 are moved slightly in direction C as they push the cartridges on each shelf back when the ratcheting plate moves up.

Figure 3D:
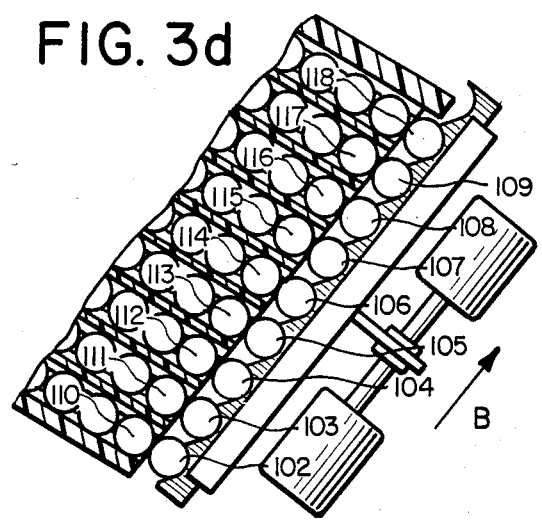

FIG. 3d shows the ratcheting plate having returned to its original position as shown in FIG. 3a. It will be noted that each of the cartridges is now one step closer to the dispensing position. As can be seen, the order of exit for the cartridges proceeds such that the cartridges from the bottom to the top groove are the first to be dispensed followed by the cartridges from the top shelve in order. When the top shelf is emptied, the cartridges on the shelf next to the top are dispensed in order. Depending on the application, this ordered dispensing may be advantageous to the operation of the machine into which the magazine dispenses.

Figure 4:
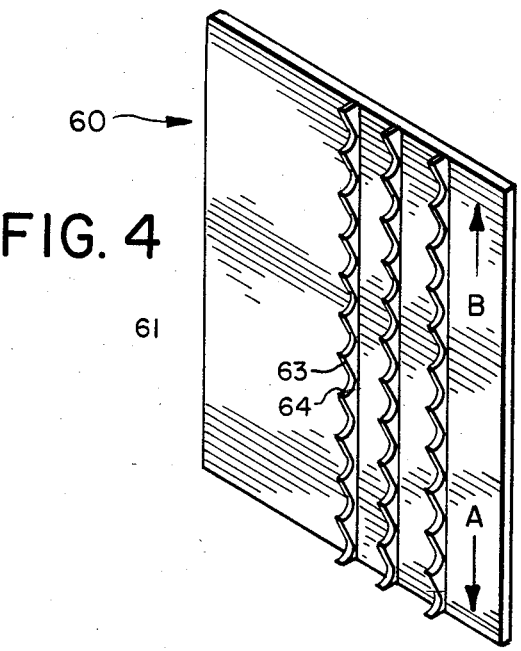
FIG. 4 is a perspective view of an alternative embodiment of the ratcheting plate of the present invention.

FIG. 4 shows an alternative embodiment for the configuration of the ratcheting plate. In this embodiment, the ratcheting plate 60 comprises a main portion 61 which is substantially planar and a set of cartridge guides 62 which protrude from the plate. The guides run parallel to each other and generally in directions A and B. Each guide is comprised of a set of first cartridge contacting surfaces 63 and a set of second cartridge contacting surfaces 64. As in the grooved embodiment, the first cartridge contacting surfaces are set at an angle with respect to the general plane of the plate and the second cartridge contacting surfaces are set at a corresponding angle which is less than the first angle. This embodiment using protruding guides in the place of the grooves may be preferred for applications where the cartridges have certain irregularities around which the guides could be designed.

Figure 5:
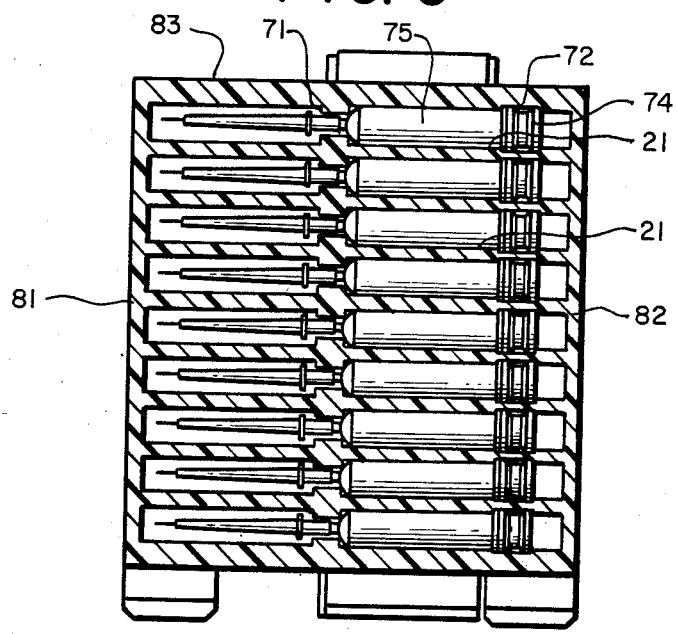
FIG. 5 is another vertical cross section of the magazine of the present invention taken along line 5—5 of FIG. 2.

FIG. 5 shows vertical cross section taken along line 5—5 in FIG. 2. This view shows the side walls 81 and 82 as well as a top 83. In this section, the configuration of the shelves 21 is also shown. As can be seen, each shelf possesses certain surface features such as the rails 71 and channels 72. These surface features are intended to aid in the rolling of the cartridges along the shelves. For example, groove 72 is intended to receive the gripping flange 74 of the syringe 75. Rail 71 receives the narrow part of the syringe to support it during rolling.

What has been described has been a magazine for use in conjunction with an analyzing apparatus such as that for analyzing blood samples which uses syringes for cartridges. Although this embodiment has been illustrated and is preferred, it is believed that other embodiments which do not part from the true scope of the invention will become apparent to those skilled in the art. Accordingly, all such embodiments are intended to be covered by the appended claims.

We claim:

1. A magazine for controllably dispensing generally cylindrical objects, the magazine comprising:
   a plurality of shelves positioned parallel to each other, each of the shelves being configured so as to allow a plurality of the objects to move along its surface, each of the shelves being spaced from another of the shelves at a first distance greater than the greatest diameter of the objects, each of the shelves having a substantially linear edge, and all of said linear edges being generally aligned in a first plane;
   a ratcheting plate with a major surface arranged such that the major surface faces the first plane, is generally parallel to the first plane, and is at a second distance from the first plane which is greater than the greatest diameter of the objects, said major surface comprising a plurality of surface features configured and arranged such that the objects can move along the major surface with less resistance in a first direction which is perpendicular to the shelves than in a second opposite direction;
   means for reciprocally moving the ratcheting plate in said first and second directions a third distance greater than the greatest diameter of the objects; and
   means for moving the objects along the shelves toward the ratcheting plate;
   wherein the surface features of the major surface of the ratcheting plate comprise a series of parallel adjacent grooves running in a direction parallel to the linear edges of the shelves, each of said grooves being comprised of a first and second wall, each of said first walls being oriented generally at a first internal angle relative to the first plane, and each of said second walls being oriented generally at a second internal angle relative to the first plane, said second angle being greater than said first angle whereby one of said objects may pass over said first wall in said first direction with less resistance than it may pass over said second wall in said second direction.

2. The magazine of claim 1 wherein each of said first walls is substantially planar.

3. The magazine of claim 1 wherein each of said second walls is substantially planar.

4. The magazine of claim 3 wherein each of said first walls is substantially planar.

5. The magazine of claim 3 wherein each of said first walls are curved with a constant radius of curvature approximately equal to a radius of curvature defining a cylindrical portion of the objects.

6. The magazine of claim 1 wherein the surface features of of the major surface of the ratcheting plate comprise a series of guides projecting from said major surface which contact said objects, each of said guides comprised of a first object contacting surface and a second object contacting surface, each of said first object contacting surfaces being oriented generally at a first angle relative to the first plane, and each of said second object contacting surfaces being oriented generally at a second angle relative to the first plane, said second angle being greater than said first angle whereby one of said objects may pass over said first object contacting surface in said first direction with less resistance than it may pass over said second object contacting surface in said second direction.

7. The magazine of claim 6 wherein each of said second object contacting surfaces is substantially planar.

8. The magazine of claim 6 wherein each of said second object contacting surfaces is curved with a constant radius of curvature approximately equal to a radius of curvature defining a cylindrical portion of the objects.

9. The magazine of claim 1 wherein each of said first walls are curved with a constant radius of curvature approximately equal to a radius of curvature defining a cylindrical portion of the objects.

10. The magazine of claim 9 wherein each of said first object contacting surfaces is substantially planar.

11. The magazine of claim 10 wherein each of said second object contacting surfaces is substantially planar.

12. The magazine of claim 10 wherein each of said second object contacting surfaces is curved with a constant radius of curvature approximately equal to a radius of curvature defining a cylindrical portion of the objects.

13. The magazine of claims 1, 4, 5, 6, 11 or 12 wherein the means for moving the objects along the shelf comprises setting the shelf at an angle with respect to the horizontal such that gravity causes the objects to roll along the shelf toward the ratcheting plate.

14. The magazine of claims 1, 4, 5, 6, 11 or 12 wherein each of the shelves further comprises surface features to facilitate rolling of the objects along it.

15. The magazine of claims 1, 4, 5, 6, 11 or 12 further comprising a top and two side walls for enclosing said shelves.

16. The magazine of claims 1, 4, 5, 6, 11 or 12 further comprising releasable attachment means whereby said magazine may be attached to and disattached from an analyzing machine.

17. The magazine of claims 1, 4, 5, 6, 11 or 12 wherein said means for reciprocally moving the ratcheting plate comprises a first solenoid for moving said ratcheting plate in the first direction and a second solenoid for moving said ratcheting plate in the second direction.

18. The magazine of claims 1, 4, 5, 6, 11 or 12 wherein said means for reciprocally moving the ratcheting plate comprises a solenoid for moving said ratcheting plate in one of said directions and a spring for moving said ratcheting plate in the other of said directions.

19. The magazine of claims 1, 4, 5, 6, 11 or 12 wherein said means for reciprocally moving the ratcheting plate comprises a step motor for moving said ratcheting plate in both of said directions.

* * * * *